(12) United States Patent
Welin et al.

(10) Patent No.: US 12,314,111 B2
(45) Date of Patent: May 27, 2025

(54) POWER RESOURCE MANAGEMENT

(71) Applicant: Telefonaktiebolaget LM Ericsson (publ), Stockholm (SE)

(72) Inventors: Annikki Welin, Solna (SE); Jon Reveman, Vaxholm (SE); Catalin Meirosu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 69 days.

(21) Appl. No.: 17/791,244

(22) PCT Filed: Feb. 14, 2020

(86) PCT No.: PCT/SE2020/050168
§ 371 (c)(1),
(2) Date: Jul. 7, 2022

(87) PCT Pub. No.: WO2021/162596
PCT Pub. Date: Aug. 19, 2021

(65) Prior Publication Data
US 2023/0297154 A1    Sep. 21, 2023

(51) Int. Cl.
*G06F 1/3209*   (2019.01)
*G06F 9/48*   (2006.01)

(52) U.S. Cl.
CPC .......... *G06F 1/3209* (2013.01); *G06F 9/4893* (2013.01)

(58) Field of Classification Search
CPC ...... G06F 1/3209; G06F 1/3203; G06F 1/329; G06F 9/4893; G06F 1/3287; Y02D 10/00;
(Continued)

(56) References Cited

U.S. PATENT DOCUMENTS 7,609,171 B2   10/2009   Haapoja et al.
8,032,891 B2   10/2011   Chauvel et al.
(Continued)

OTHER PUBLICATIONS

Tsiftes, et al., "Velox VM: A Safe Execution Environment for Resource-Constrained IoT Applications," Journal of Network and Computer Applications, vol. 118, 2018, 30 pages.
(Continued)

*Primary Examiner* — Brian T Misiura
(74) *Attorney, Agent, or Firm* — Withrow & Terranova, PLLC

(57) ABSTRACT

There is provided a method for managing power resources of a mobile network application program including application code, the method comprising: assigning a profile to each section of the application code, wherein each profile comprises information indicative of at least one of: a level of energy demand of the respective section, a level of functional priority of the respective section, and a level of accuracy of the functionality associated with the respective section; determining an operation mode for running the application program, wherein the operation mode includes one or more criteria which are to be satisfied by a profile assigned to a section of the application code in order for the respective section to be executed; selecting one or more sections of the application code which satisfy the criteria included in the operation mode; a running the application program by only executing the selected one or more sections.

19 Claims, 8 Drawing Sheets

(58) Field of Classification Search
CPC ........ Y02D 30/00; Y02D 30/50; Y02D 30/70; G06Q 10/0631
USPC ............................................................ 713/2
See application file for complete search history.

(56) References Cited

U.S. PATENT DOCUMENTS

| | | | | |
|---|---|---|---|---|
| 8,811,208 | B2* | 8/2014 | Johnsson | H04L 41/0833 370/252 |
| 8,958,699 | B2* | 2/2015 | Huang | H04J 14/0282 398/115 |
| 10,506,460 | B2* | 12/2019 | Tapia | H04L 41/20 |
| 2005/0108587 | A1* | 5/2005 | Cooper | G06F 1/3203 713/320 |
| 2006/0053320 | A1* | 3/2006 | Lin | G06F 1/3287 713/300 |
| 2007/0198864 | A1* | 8/2007 | Takase | G06F 11/3062 713/300 |
| 2007/0220293 | A1 | 9/2007 | Takase | |
| 2008/0057894 | A1 | 3/2008 | Aleksic et al. | |
| 2008/0059814 | A1* | 3/2008 | Esliger | G06F 1/3203 713/300 |
| 2019/0235605 | A1* | 8/2019 | Chenchev | G06F 9/44505 |
| 2023/0345307 | A1* | 10/2023 | Forsman | H04W 28/20 |

OTHER PUBLICATIONS

Vassiliadis, et al., "A Significance-Driven Programming Framework for Energy-Constrained Approximate Computing," International Conference on Computing Frontiers, May 18-21, 2015, Ischia, Italy, ACM, 8 pages.

Yang, et al., "NetAdapt: Platform-Aware Neural Network Adaptation for Mobile Applications," European Conference on Computer Vision, Sep. 2018, 16 pages.

International Search Report and Written Opinion for International Patent Application No. PCT/SE2020/050168, mailed Nov. 4, 2020, 11 pages.

Author Unknown, "Power Management in Intel Architecture Servers," White Paper, Apr. 2009, Intel, 12 pages.

\* cited by examiner

POWER RESOURCE MANAGEMENT

This application is a 35 U.S.C. § 371 national phase filing of International Application No. PCT/SE2020/050168, filed Feb. 14, 2020, the disclosure of which is incorporated herein by reference in its entirety.

TECHNICAL FIELD

The present disclosure relates to the field of power resource management for application programs, such as mobile network application programs, and particularly to radio access network (RAN) application programs.

BACKGROUND

Our society is becoming increasingly dependent on operational internet and telephony. Private individuals and companies require access to reliable networks and services. Regulation and rules on operational safety ensure that the operators meet basic requirements, which include requirements for reserve power for the mobile network's base stations. As an example, regulatory requirements for the operators in Sweden require reserve power for four hours outside the urban areas and on hour in urban areas with more than 8,000 inhabitants. The authority bases its regulatory demands on the fact that statistically more power outages occur in rural areas and that the fault repair times can be longer due to the distance.

To be able to reduce power consumption and to adapt to the limited power resources, several methods can be used, such as assigning priority to different workloads on different servers at different times of the day. Other examples include giving different power states for the processors, or giving the application profiles that limits or guides how the application should execute.

The modern power grid is known to be highly reliable in urban areas, but it still has risks of outages due to severe weather conditions such as storms, hurricanes, fire, and earthquakes. Specifically, the supporting functions at the power grid may suffer due to these reasons, for example where base stations have no knowledge or ability to differentiate how much power they can use and for how long. Accordingly, there is a demand for effective power management techniques that can reduce power consumption without compromising on important functions of the application program.

SUMMARY

One of the common techniques for power management in the context of mobile network applications involves providing an environment that is able to detect when a power budget has been consumed, and slow down the application threads. This technique can be performed via dynamic voltage and frequency scaling (DVFS) with a custom or tailor-made governor that forces reduce processor frequency for example, regardless of computational demand. However, in this case it is not possible for the application to request certain threads to be allowed to consume power as usual which means that certain important functions may be slowed down or interrupted.

Another example involves providing a framework of approximate computing that allows specifying, for example, the precision level of computations at runtime, thus saving energy demanding on the mode in which the application is launched. However, this technique compromises in dynamicity as the application is precompiled and deployed to execute with one particular energy consumption profile.

Another example of mobile network application power management involves allowing a user to automatically simplify a pre-trained neural network or machine learning algorithm to meet the resource budget of a platform while maximizing the accuracy. This technique uses direct metrics for resource consumption, and the direct metrics are evaluated by using empirical measurements, therefore removing the requirement for detailed platform-specific knowledge. However, even when there is a power shortage, the measurements still need to be performed which means that power that could be reserved for the runtime application is unnecessarily used for performing measurements.

Another example relates to power management in different generations of microprocessors and chipsets. Power consumed by a system can be reduced when applications do not require the full processing power, and the system can deliver higher performance with a power boost during periods of high loads. However, the power management is performed per-processor or per-core, thus affecting all applications that execute on the same processor or core indiscriminately. In order to adapt the energy consumption according to workload and utilization policies, the processor makes use of so-called "P-states" which are predefined sets of configurations parameters that correspond to different levels of maximum performance that can be achieved within each of these states. While the P-states are defined in a generic manner, the actual performance level achieved may be different between different categories of processors.

One aspect of the present disclosure provides a method for managing power resources of a mobile network application program. The mobile network application program includes application code executable by a computer or processor, and the application code comprises a plurality of sections. The method comprises: assigning a profile to each of the plurality of sections of the application code, wherein each profile comprises information indicative of at least one of: a level of energy demand of the respective section of the application code, a level of functional priority of the respective section of the application code, and a level of accuracy of the functionality associated with the respective section of the application code; determining an operation mode for running the application program, wherein the operation mode includes one or more criteria which are to be satisfied by a profile assigned to a section of the application code in order for the respective section to be executed; selecting one or more sections of the application code which satisfy the criteria included in the determined operation mode; and running the application program by only executing the selected one or more sections of the application code.

Another aspect of the disclosure provides a method for managing power resources of a mobile network application program. The application program comprises a plurality of application components executable by a computer or processor. The method comprises: acquiring information associated with energy consumption behavior of each of the plurality of application components; determining a policy for running the application program, wherein the policy indicates, for each of the plurality of application components, one or more criteria at which the respective application component is to be executed, and wherein determining the policy is based on the acquired information associated with the energy consumption behavior of each of the application components and a current amount of energy resource available to the application program; and running the application program by executing one or more application components only when the respective component satisfies the criteria indicated in the determined policy for the respective component.

Another aspect of the disclosure provides a computer program product comprising a computer readable medium, the computer readable medium having computer readable code embodied therein, the computer readable code being configured such that, on execution by a suitable computer or processor, the computer or processor is caused to perform the method as described herein.

Another aspect of the disclosure provides an apparatus configured to manage power resources of a mobile network application program including application code. The application code comprises a plurality of sections. The apparatus comprises processing circuitry and memory collectively configured to: assign a profile to each of the plurality of sections of the application code, wherein each profile comprises information indicative of at least one of: a level of energy demand of the respective section of the application code, a level of functional priority of the respective section of the application code, and a level of accuracy of the functionality associated with the respective section of the application code; determine an operation mode for running the application program, wherein the operation mode includes one or more criteria which are to be satisfied by a profile assigned to a section of the application code in order for the respective section to be executed; select one or more sections of the application code which satisfy the criteria included in the determined operation mode; and run the application program by only executing the selected one or more sections of the application code.

Another aspect of the disclosure provides an apparatus configured to manage power resources of a mobile network application program. The application program comprises a plurality of application components, and the apparatus comprises processing circuitry and memory collectively configured to: acquire information associated with energy consumption behavior of each of the plurality of application components; determine a policy for running the application program, wherein the policy indicates, for each of the plurality of application components, one or more criteria at which the respective application component is to be executed, and wherein determining the policy is based on the acquired information associated with the energy consumption behavior of each of the application components and a current amount of energy resource available to the application program; and run the application program by executing one or more application components only when the respective component satisfies the criteria indicated in the determined policy for the respective component.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Embodiments of the disclosure thus provide an efficient way of managing power resources of a mobile network application program that allows different power granularity of application execution in order to satisfy energy constraints. Embodiments of the disclosure allow facilitation of compliance to new regulatory frameworks-given the new regulatory frameworks, holding energy budgets would be no longer an optional capability when methods according to embodiments of the disclosure are employed. Methods and apparatuses according embodiments of the disclosure also enable predictable operation in areas where running on battery power happens often and any other high-risk areas for power outages due to storms, floods, etc., as well as reducing the site cost by reducing the amount of battery power required while fulfilling regulatory requirements. In addition, methods and apparatuses according to embodiments of the disclosure help increase the overall sustainability of sites by requiring fewer batteries to be installed and therefore fewer natural resources.

It will be appreciated that although the methods and apparatuses of the present disclosure are described herein with reference to mobile networks, the methods and apparatuses may be implemented or utilized in other types of applications. For example, methods and apparatuses described herein may be applied at data servers and/or routers, etc. Accordingly, according to the present disclosure methods for managing power resources of an application program (which may or may not be associated with a mobile network) and apparatuses configured to manage power resources of an application program (which may or may not be associated with a mobile network).

Figure 1:
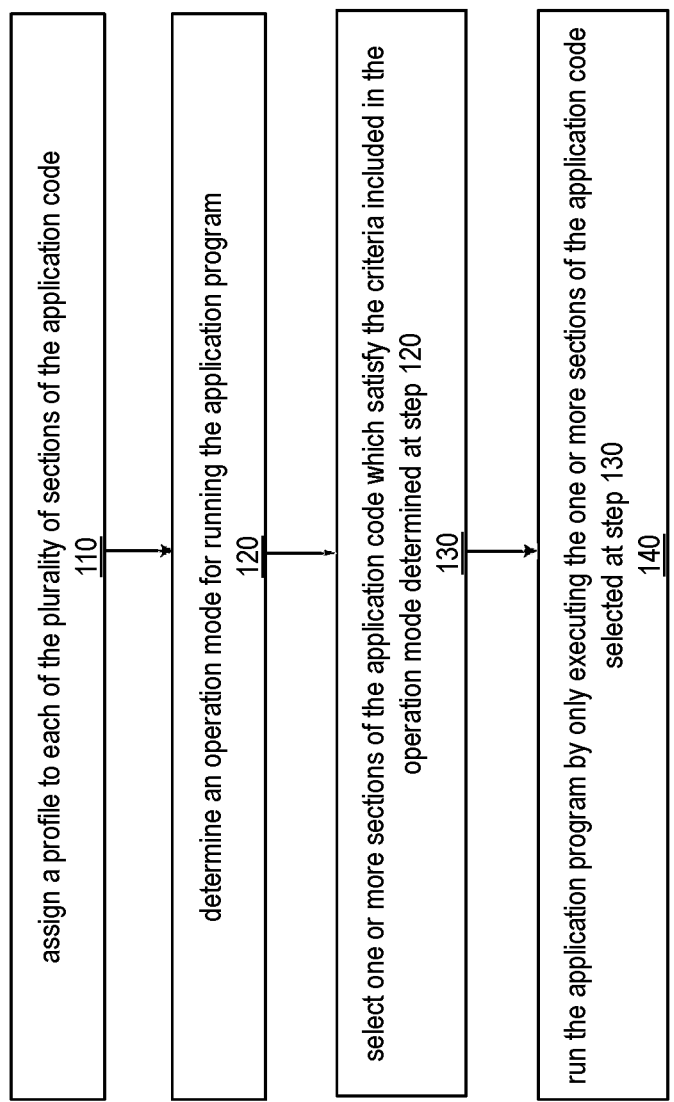
FIG. 1 is a flowchart illustrating a method for managing power resources of a mobile network application program according to embodiments of the disclosure.

FIG. 1 is a flowchart illustrating a method for managing power resources of a mobile network application program according to embodiments of the disclosure. The illustrated method can generally be performed by or under the control of a computer or processor. The application program includes application code executable by a computer or processor, and the application program comprises a plurality of sections. In some embodiments, the mobile network program may be partitioned in to the plurality of sections based on at least one of: different functionalities of parts of the application code, and different energy demands of parts of the application code.

With reference to FIG. 1, at step 110, a profile is assigned to each of the plurality of sections of the application code. Each profile comprises information indicative of at least one of: a level of energy demand of the respective section of the application code, a level of functional priority of the respective section of the application code, and a level of accuracy of the functionality associated with the respective section of the application code.

Then, at step 120, an operation mode for running the application program is determined. The operation mode includes one or more criteria which are to be satisfied by a profile assigned to a section of the application code in order for the respective section to be executed. In some embodiments, the determination of an operation mode for running the application program may be performed by an operator. The determination may be performed at runtime.

In some embodiments, each profile assigned at step 110 may comprise information indicative of a level of functional priority of the respective section of the application code, and the level of functional priority of each profile is represented by a priority value. At least one or more criteria of the operation mode determined at step 120 may be indicative of a minimum priority value to be satisfied by a profile for said profile to be selected for execution. The priority value representing the level of functional priority of each profile may be selected from one of a plurality of predetermined priority values. In some embodiments, the determined operation mode may include a criterion indicating that a profile having a first priority value is to be selected for execution. For example, there may be one or more sections of the application code which are associated with essential functions of the mobile network application program. In this case, these one or more sections may be assigned with profiles having a first priority value, and any determined operation mode may always include a criterion indicating that a profile having a first priority value is to be selected for execution. In this manner, the method can ensure that section(s) of the application code associated with essential functions of the mobile network are executed when the application program is running.

In some embodiments, determining an operation mode for running the application program at step 120 may comprise selecting the operation mode from a plurality of candidate operation modes. In these embodiments, the method may further comprise modifying, by an operator, at least one of the one or more criteria included in a candidate operation mode. This modification may be performed while the application program is running.

Although not illustrated in FIG. 1, in some embodiments the method may further comprise acquiring information associated with a current amount of energy resource available to the application program. In these embodiments, at step 120 determining an operation mode for running the application program may be based on the acquired information associated with a current amount of energy resource available to the application program. Furthermore, in these embodiments, the information associated with a current amount of energy resource available to the application program may be acquired from a power supply unit connected to a computer or processor executing the application program. The power supply unit may comprise at least one of a mains power supply and a battery power supply.

In some embodiments, the method may comprise switching between an automatic determination approach in which the operation mode is determined automatically, for example based on the acquired information associated with a current amount of energy resource available to the application program, and a manual determination approach in which the operation mode is determined by an operator. The manual determination approach may be implemented as an override to a default automatic determination approach.

In addition, in some embodiments the method may further comprise: acquiring updated information associated with a current amount of energy resource available to the application program, determining a new operation mode for running the application program based on the updated information associated with a current amount of energy resource available to the application program, selecting one or more new sections of the application code which satisfy the criteria included in the determined new operation mode, and running the application program by only executing the selected one or more new sections of the application code.

Subsequently, at step 130, one or more sections of the application code which satisfy the criteria included in the operation mode determined at step 120 are selected. Then, at step 140, the application program is run by only executing the one or more sections of the application code selected at step 130.

By way of an example to illustrated the method of FIG. 1, the plurality of sections of the application code may contain more than one sections associated with computing a Fast Fourier Transform (FFT) operation. The sections associated with FTT operation may be regarded as alternatives in this instance. Each of these sections that is associated with FFT computation may have a different level of precision and energy demand, which can be represented by a priority value included in the respective profile assigned to the section of the application code. In this case, an operation mode may be determined based on an operational objective, such that the one or more criteria included in the operation mode would cause the selection of one of the sections associated with FFT computation using priority values. This way, a transparent trade-off between the precision of the computation and the amount of energy spent to achieve it can be made. The computation algorithms associated with each of the sections of the application code may be implemented through libraries dynamically linked by the application code, which means that only the library that is to be used and that contains the instructions to be executed is loaded in the memory.

As a similar example, a section of the application code associated with a deep neural network model can be selected among a plurality of sections each associated with an available pre-trained model, and this selection can be based on energy constraints for the inference. Similarly, in this stance the sections associated with the pre-trained models are to be regarded as alternatives. The sections associated with pre-trained models may be delivered as part of the application package (and thus stored in a database associated with the application program) or as configurations parameters for the application program.

Another example of the described method involves introducing the use of conditional execution steps. The conditional execution steps can trigger an application instance to postpone actions in response to requests received by the application program. The conditional execution may be implemented by way of one or more criteria included in an operation mode. This does not set a power consumption limit explicitly nor monitor the power consumption of the application program in order to postpone execution of certain sections of the application code. Information from the power supply unit (that for example reflect the level of energy remaining in the battery) may be used as a condition to automatically trigger transitions between different operation modes. For example, transitioning to an operation mode which allows fewer sections of the application code to be executed (while prioritizing sections of functional importance) as the battery power depletes, and transitioning to an operation mode which allows more sections of the application code to be executed when the regular main power supply is restored.

Figure 2:
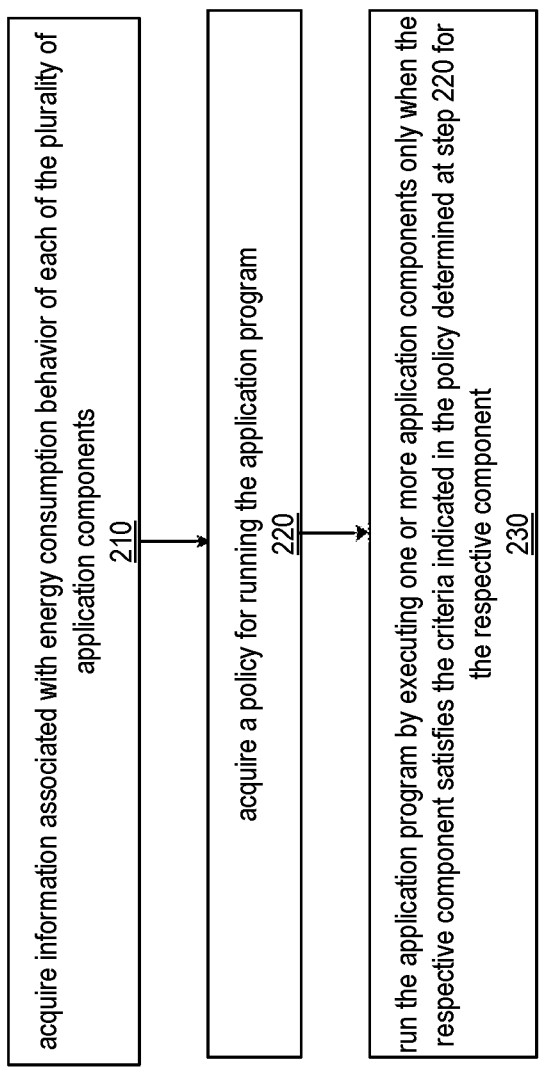
FIG. 2 is a flowchart illustrating a method for managing power resources of a mobile network application program according to embodiments of the disclosure.

FIG. 2 is a flowchart illustrating a method for managing power resources of a mobile network application program according to embodiments of the disclosure. The illustrated method can generally be performed by or under the control of a computer or processor. The application program comprises a plurality of application components executable by a computer or processor. The application program in this embodiment is a precompiled application.

With reference to FIG. 2, at step 210, information associated with energy consumption behavior of each of the plurality of application components is acquired.

Subsequently, at step 220, a policy for running the application program is determined. The determined policy indicates, for each of the plurality of application components, one or more criteria at which the respective application component is to be executed. The determination of the policy at step 220 is based on the information associated with the energy consumption behavior of each of the application components acquired at step 210, and a current amount of energy resource available to the application program. The determined policy may be a traffic policy in a Policy and Charging Rules Function (PCRF) in 4G or a Policy Control Function (PCF) in 5G.

In some embodiments, determining a policy for running the application program at step 220 may comprise selecting the policy from a plurality of candidate policies. Alternatively or in addition, in some embodiments determining a policy for running the application program may be performed by an operator. In some embodiments, for at least one of the plurality of application components, at least one of the one or more criteria indicated by the policy determined at step 220 indicates that the respective application component is to be executed only for a specific objective (e.g. only for traffic associated with a specific functionality).

Then, at step 230, the application program is run by executing one or more application components only when the respective component satisfies the criteria indicated in the policy determined at step 220 for the respective component.

Although not illustrated in FIG. 2, the method may further comprise the steps of: acquiring updated information associated with a current amount of energy resource available to the application program, determining a new policy for running the application program based on the information associated with the energy consumption behavior of each of the application components acquired at step 210 and the updated information associated with a current amount of energy resource available to the application program, and running the application program by executing one or more application components only when the respective component satisfies the criteria indicated in the determined new policy for the respective component. In these embodiments, the new policy also indicates, for each of the plurality of application components, one or more criteria at which the respective application component is to be executed.

Figure 3:
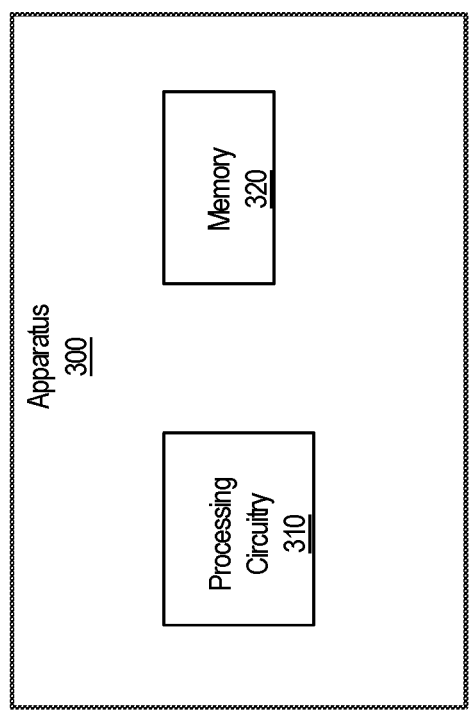
FIG. 3 a block diagram of an apparatus configured to manage power resources of a mobile network application program according to embodiments of the disclosure.

FIG. 3 is a block diagram of an apparatus configured to manage power resources of a mobile network application program according to embodiments of the disclosure. The mobile network application in this embodiment includes application code which in turn comprises a plurality of sections. The apparatus may be a network node in a mobile network, for example.

As shown in FIG. 3, the apparatus 300 comprises processing circuitry 310 and memory 320. The processing circuitry 310 and the memory 320 may be collectively configured to perform the methods as described with respect to FIG. 1 and FIG. 2.

In more detail, in one embodiment the processing circuitry 310 and the memory 320 are collectively configured to perform the following steps:

assign a profile to each of the plurality of sections of the application code, wherein each profile comprises information indicative of at least one of: a level of energy demand of the respective section of the application code, a level of functional priority of the respective section of the application code, and a level of accuracy of the functionality associated with the respective section of the application code;

determine an operation mode for running the application program, wherein the operation mode includes one or more criteria which are to be satisfied by a profile assigned to a section of the application code in order for the respective section to be executed;

select one or more sections of the application code which satisfy the criteria included in the determined operation mode; and run the application program by only executing the selected one or more sections of the application code.

In an alternative embodiment the processing circuitry 310 and the memory 320 may be collectively configured to perform the following steps:

acquire information associated with energy consumption behavior of each of the plurality of application components;

determine a policy for running the application program, wherein the policy indicates, for each of the plurality of application components, one or more criteria at which the respective application component is to be executed, and wherein determining the policy is based on the acquired information associated with the energy consumption behavior of each of the application components and a current amount of energy resource available to the application program; and run the application program by executing one or more application components only when the respective component satisfies the criteria indicated in the determined policy for the respective component.

It will be appreciated by the skilled person that the processing circuitry 310 and the memory 320 may be configured to perform additional step(s) of the methods described with reference to FIG. 1 and FIG. 2 above, and/or implement the step(s) of the methods in a specific manner as described with reference to FIG. 1 and FIG. 2 above. For example, in some embodiments the processing circuitry 310 and the memory 320 may be configured to, in addition to steps 110, 120, 130, 140 as described with respect to FIG. 1, the step of acquiring information associated with a current amount of energy resource available to the application program. Moreover, in this example, the processing circuitry 310 and the memory 320 may be configured to determine an operation mode for running the application program based on the acquired information associated with a current amount of energy resource available to the application program. Accordingly, for the sake of brevity the variations as described with reference to FIG. 1 and FIG. 2 will not be repeated here but will be understood to apply to the apparatus 300 of FIG. 3.

Figure 4:
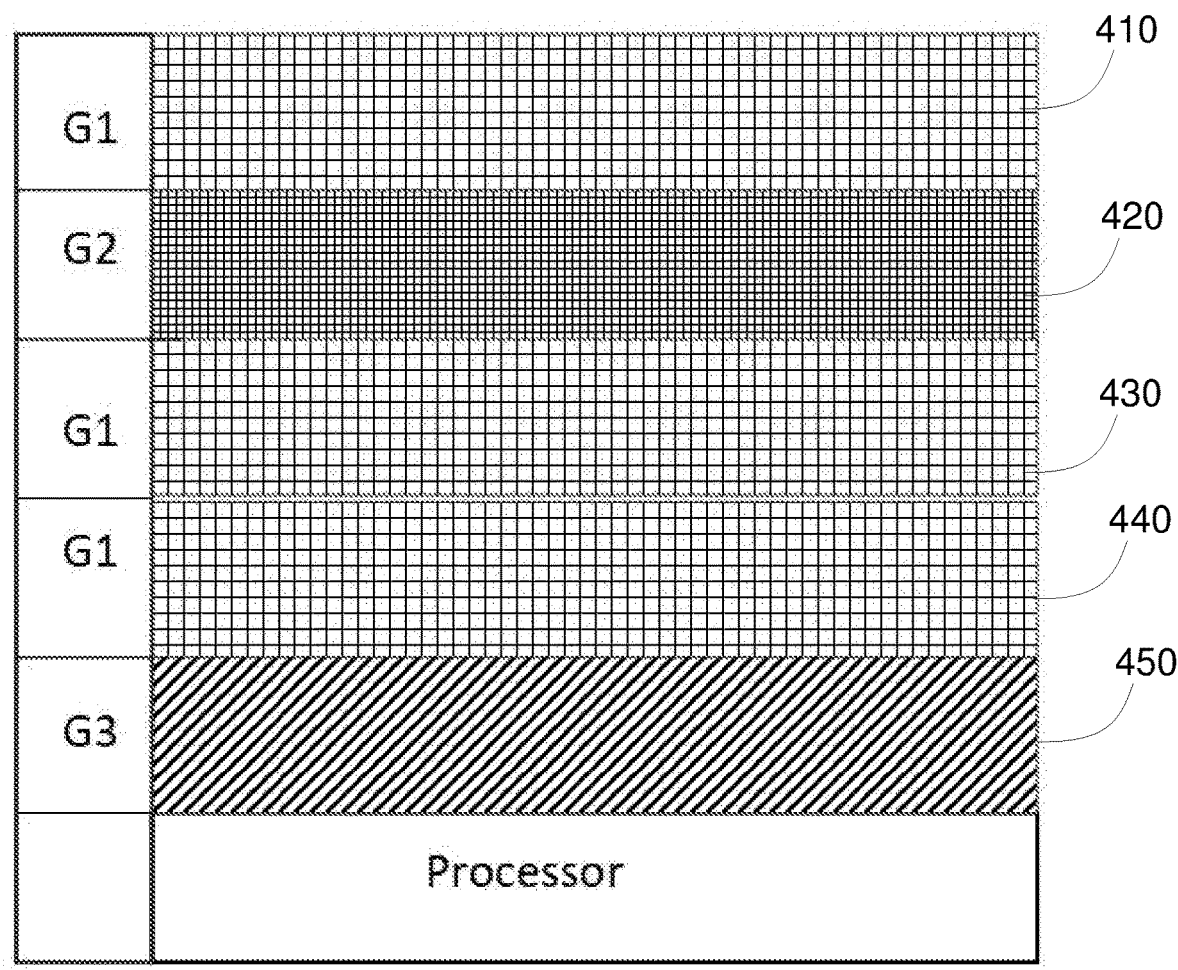
FIG. 4 is a schematic diagram illustrating application code partitioned along G-levels, according to embodiments of the disclosure.

As described with reference to FIG. 1, in some embodiments there is provided a method for managing power resources of a mobile network application program, where the application program comprises a plurality of sections. To illustrate the method illustrated in FIG. 1 by way of an example, the application code of a mobile network application program, as partitioned into a plurality of sections along G-levels, is illustrated in FIG. 4. In more detail, the application code in this embodiment comprises a first section 410, a second section 420, a third section 430, a fourth section 440, and a fifth section 450.

Figure 5:
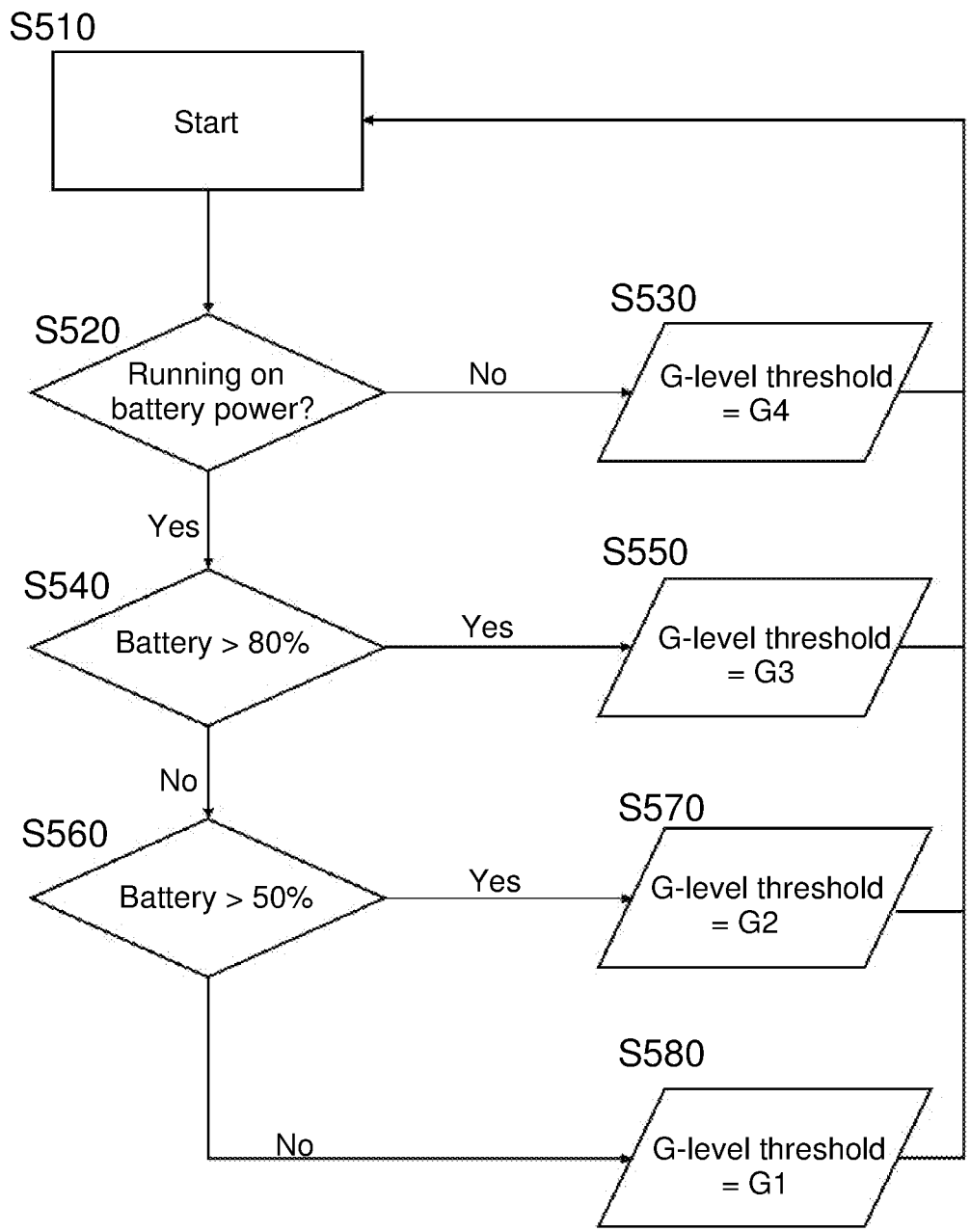
FIG. 5 is a flowchart illustrating a method for determining G-level thresholds by an apparatus during operation, based on a current amount of energy resource available, according to embodiments of the disclosure.

In this embodiment, each profile assigned to a section of the application code may include a priority value which is representative of at least one of: a level of energy demand of the respective section, a level of functional priority of the respective section, and a level of accuracy of the functionality associated with the respective section. This priority value may be referred to herein as a "G-level", where G stands for Green. Referring to FIG. 5, the first section 410, the third section 430, and the fourth section 440 are each assigned with a profile including a priority value of G1. The second section 420 is assigned with a profile including a priority value of G2, and the fifth section 450 is assigned with a profile including a priority value of G3.

Depending on information associated with the current amount of energy resource available, different sections of the application code are selected to be executed when the determined operation mode includes criteria indicating that section(s) of the application code having specific G-level(s) are to be selected for execution. This may depend on how much energy each section requires, and how important the respective section is for the application functionality. For example, in this case, an operation mode may be determined such that the operation mode includes criteria relating to the priority values (G-levels). In this case, sections of the application code with profiles including the priority value of G1 are always executed. Sections of the application code with profiles including the priority value of G2 are only executed when the one or more criteria of a determined operation mode dictate that sections with profiles including priority values of G2 or higher (i.e. G1 or G2) are to be executed. Sections of the application code with profiles including the priority value of G3 are only executed when the one or more criteria of a determined operation mode dictate that sections with profile including priority values of G3 or higher (i.e. G1, G2, or G3) are to be executed.

The determination of an operation mode may be made at runtime, and the one or more criteria associated with priority values may be passed to the application instance as a configuration parameter that can be modified dynamically while the application instance is executed. In some embodiments, this can be implemented by using condition execution instance (e.g. "if G>3 execute; else do nothing") which are supported by all major programming languages.

The G-levels enable a user, e.g. the developer of the application program, to define at design time which parts of the application program associated with certain functionalities will be executed under which power conditions (i.e. the current amount of energy resource available). This relieves the computer or processor the burden of executing instructions that may be considered unnecessary for a particular mode of operation. This is advantageous over power managing techniques which requiring slowing down the entire application program, for example by using P-states.

To further illustrate the method illustrated in FIG. 1 and FIG. 2, we refer to the flowchart in FIG. 5 which illustrates a method for determining G-level thresholds by an apparatus during operation, based on a current amount of energy resource available. The determination of different G-level thresholds as illustrated in FIG. 5 may be regarded as part of the step of determining an operation mode for running an application program, as explained with reference to FIG. 1, or part of the step of determining a policy for running an application program, as explained with reference to FIG. 2. In the case of determining an operation mode, the operation mode includes one or more criteria which are to be satisfied by a profile assigned to a section of the application code in order for the respective section to be executed; in the case of determining a policy, the policy indicates, for each of the plurality of application components of the application program, one or more criteria at which the respective application component is to be executed. For example, only traffic or services classified with G-levels higher than a determined G-level threshold are executed (e.g. only executing an application component for traffic classified as G1 or G2, but not for traffic classified as G3). This will be explained in more detail with reference to FIG. 7.

Referring to FIG. 5, the method begins at step S510. As will be become clear following the description below, the illustrated method can be performed in a loop thus returning to step 510 once the method reaches the end.

The method proceeds to step S520, at which it is determined whether the application program is running on battery power. If it is determined at step S520 that the application program is not running on battery power, i.e. the application program is running on mains power, the method proceeds to step S530, at which the G-level threshold is determined as G4; if it is determined that the application program is running on battery power, the method proceeds to step S540.

At step S540, it is determined whether the level of the battery power on which the application program is run is higher than 80%. If it is determined at step S540 that the battery level is higher than 80%, the method proceeds to step S550, at which the G-level threshold is determined as G3; if it is determined that the battery level is not higher than 80%, the method proceeds to step S560.

At step S560, it is determined whether the level of battery power on which the application program is run is higher than 50%. If it is determined step S560 that the battery level is higher than 50%, the method proceeds to step S570, at which the G-level threshold is determined as G2; if it is determined that the battery level is not higher than 50%, the method proceeds to step 580, at which the G-level threshold is determined as G1.

As explained above with reference to FIG. 2, the determination of a policy is based in part on a current amount of energy resource available to the application program. Therefore, steps S520, S540, and S560 of the illustrated method in FIG. 5 may be regarded as the step of acquiring information associated with a current amount of energy source to the application program.

Since the current amount of energy resources available, including whether the application is running on battery power and the amount of battery power left, may change constantly depending on a number of external factors, after performing each of the steps S530, S550, S570, and S580 at which a G-level threshold is determined, the method may return to S510 which restarts the method for determining a (new) G-level threshold. This therefore ensures that a suitable G-level threshold is determined and updated depending on the current amount of energy resources available.

Figure 6:
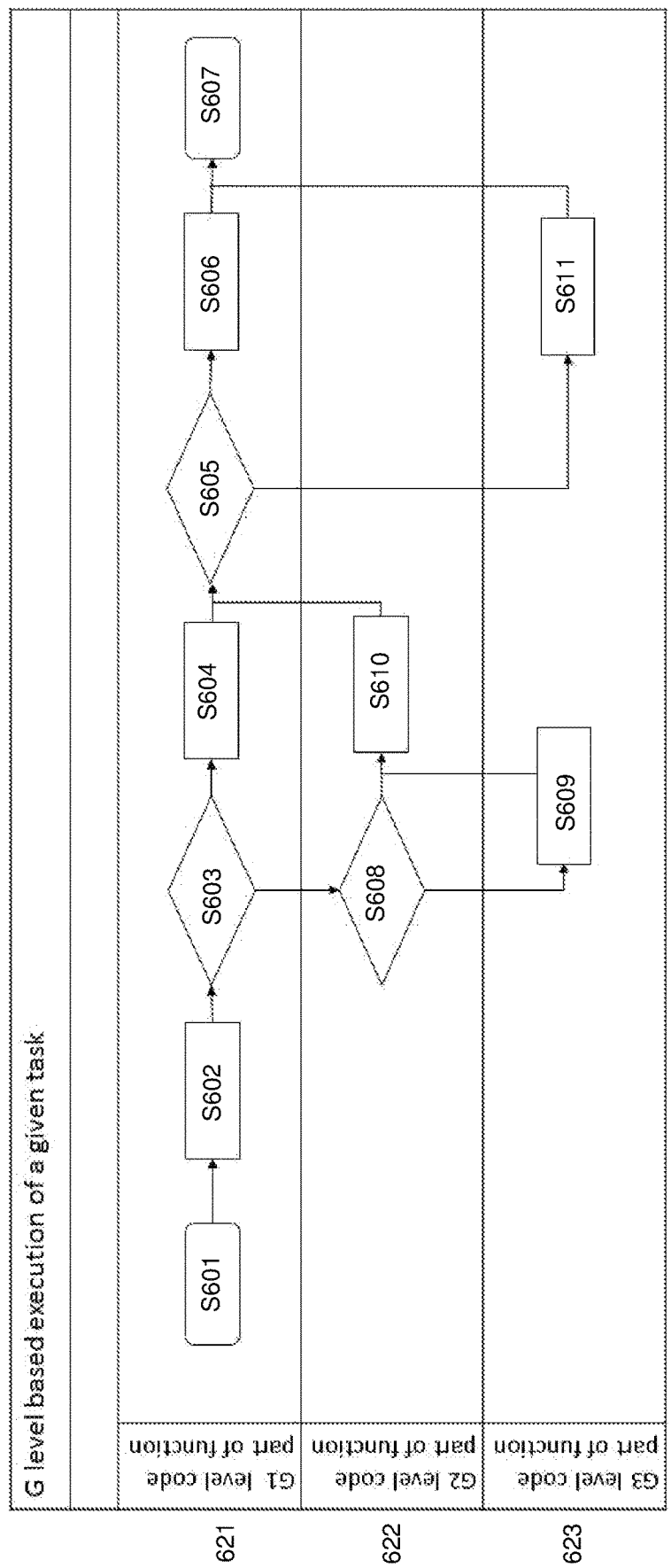
FIG. 6 is a flowchart illustrating G-level-based execution of a given task, according to embodiments of the disclosure.

To further illustrate the method for managing power resources of a mobile network application program, where the application code of the application program comprises a plurality of sections, we refer to FIG. 6 which is a flowchart illustrating G-level-based execution of a given task, according to embodiments of the disclosure. In the embodiment described with reference to FIG. 6, the application program comprises three different sections of the application code, which are represented by three levels of a table in which the flowchart is shown.

The first section 621, the second section 622, and the third section 623 of the application code are respectively labelled as "G1 level code part of function", "G2 level code part of function", and "G3 level code part of function" in the table of FIG. 6. The partition operation resulting in these different sections may be based on at least one of: different functionalities of parts of the application code, and different energy demands of parts of the application code. For example, the "G1 level code part of function" may represent a baseline at which essential parts of the application program that is required to run regardless of current amount of available energy resource, the "G2 level code part of function" may represent an alternative implementation which should only be executed if energy conditions allow such execution, and the "G3 level code part of function" may represent an optimized implementation which should only be executed if energy availability is at the maximum. The first section 621 is assigned with a profile including the priority value of G1. The second section 622 is assigned with a profile including the priority value of G2. The third section 623 is assigned with a profile including the priority value of G3.

The method starts at step S601 and proceeds to step S602 at which the first section 621 of the application code is executed to perform the given task. Subsequently, the method proceeds to step S603 at which it is determined whether the current G-level threshold is lower than to G1. The G-level threshold may be determined in the way as described with reference to FIG. 5 above and therefore for the sake of brevity it will not be repeated herein.

If it is determined at step S603 that the current G-level threshold is not lower than G1 (i.e. the current G-level threshold is G1), the method proceeds to step S604 at which the first section 621 is executed to perform the given task. Alternatively, it is determined that the current G-level threshold is lower than G1 (e.g. the current G-level threshold is G2 or G3), the method proceeds to step S608.

At step S608, it is determined whether the current G-level threshold is lower than G2. If it is determined that the current G-level threshold is lower than G2 (e.g. the current G-level threshold is G3), the method proceeds to step S609 at which the third section 723 is executed to perform the given task. If it is determined that the current G-level threshold is not lower than G2 (i.e. the current G-level threshold is G2), the method proceeds to step S610 at which the second section 622 is executed to perform the given task. Moreover, subsequent to step S609, the method also proceeds to step S610 at which the second section 622 is executed to perform the given task. Therefore, if the current G-level threshold is G1 for example, only the first section 621 is executed to perform the given task; if the current G-level threshold is G2 for example, the first section 621 and the second section 622 are executed to perform the given task; if the current G-level threshold is G3 for example, the first, second, and third sections 621, 622, 632 are executed to perform the given task.

As an example, the first to third sections 623 may be part of the application code executable for performing image processing with respect to images of vehicle number plates. In this example, if there is very little energy available, e.g. lower than 50%, the G-level threshold would be determined as G1 (in the manner as described above with reference to FIG. 5) and accordingly only the first section 621 is executed to perform the task at step S604. The execution of the first section 621 may involve using simple image segmentation and recognition techniques directly on raw image input for image processing, which although may have limited success at identifying the numbers on the plate would nevertheless be more preferable and productive than completely switching off the relevant equipment. If there is more energy available, e.g. more than 50%, the G-level threshold would be determined as G2, and the second section 622 can be executed to perform the task at step S610. The execution of the second section 622 may involve using a trained neural network on raw image input for image processing. If there is even more energy available, e.g. more than 80%, the G-level threshold would be determined as G3, and the third section 623 can be executed to perform the task at step S609. The execution of the third section 623 may involve applying processing techniques such as noise reduction and histogram equalization to image data which is then made available as input to step S610 where the second section 622 can be executed to perform image processing by using a trained neural network on the pre-processed image data. Therefore, when the current G-level threshold is G3 the accuracy of number recognition can be improved.

As explained above, at step S604 the first section 621 is executed to perform the given task. Subsequently, the method proceeds to step S605 at which it is determined whether the current G-level threshold is lower than G2. At this point in the method, the current G-level threshold may have changed due to a change in the current amount of energy resources available to the application program. If it is determined that the current G-level threshold is lower than G2 (e.g. the current G-level threshold is G3), the method proceeds to step S611 at which the third section 623 is executed to perform the given task by the method ends at step S607. However, if it is determined that the current G-level threshold is not lower than G2, the method proceeds to step S606 at which the first section 621 is executed to perform the given task by the method ends at step S607.

Figure 7:
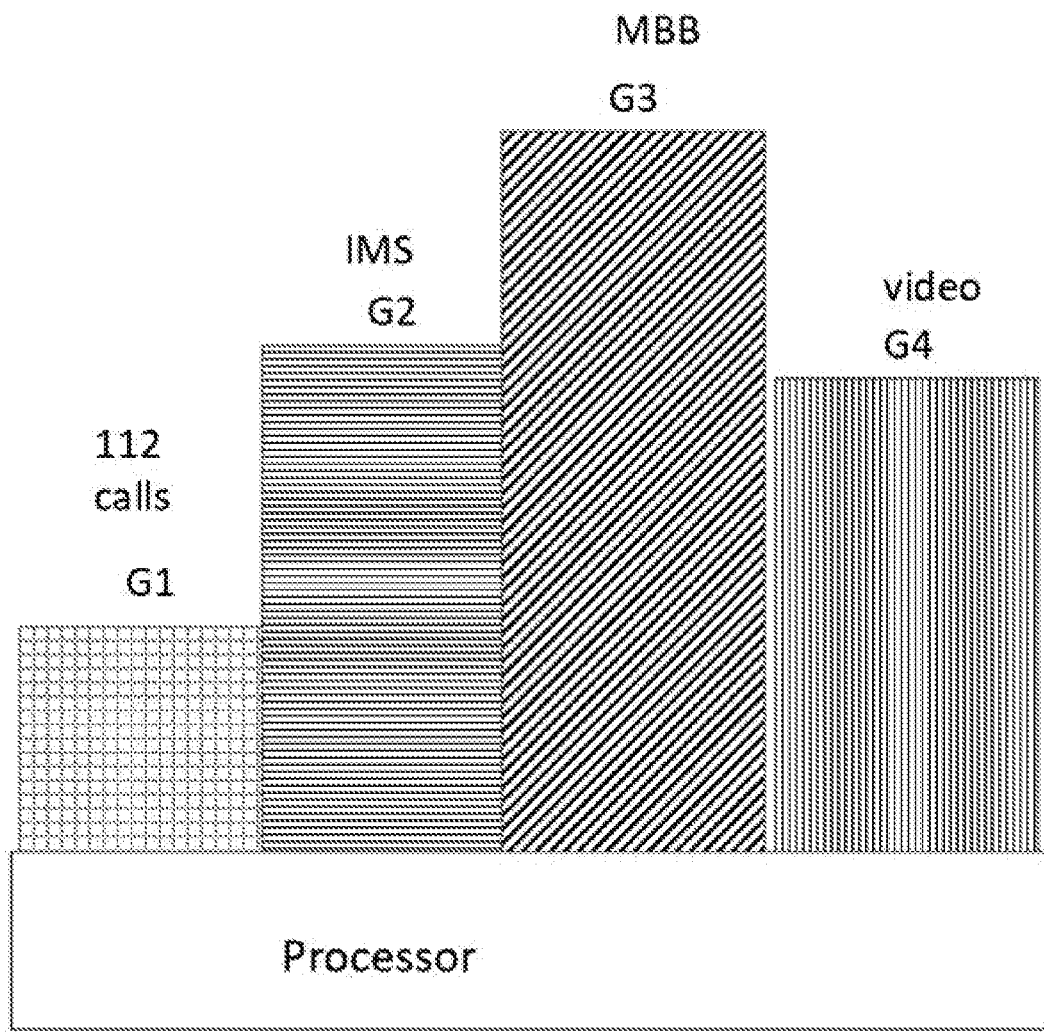
FIG. 7 is a schematic diagram illustrating G-levels associated to different types of traffic in a RAN application program, according to embodiments of the disclosure.

FIG. 7 is a schematic diagram illustrating G-levels associated to different types of traffic in a RAN application program, according to embodiments of the disclosure. Referring to FIG. 7, emergency calls traffic (labelled as "112 calls" in the drawing) are classified as G1 since they are the most important. By this logic, IP Multimedia Subsystem (IMS) traffic is classified as G2, Mobile Broadband (MBB) services is classified as G3, and video traffic is classified as G4. In severe power conditions, such as when there is a lower power situation due to infrastructural damage, a policy can be determined at compilation time based on information associated with energy consumption behavior of each of the plurality of application components such that only traffic or services classified with G-levels lower than a determined G-level threshold are executed (e.g. only executing an application component for traffic classified as G1 or G2, but not for traffic classified as G3). As explained with reference to FIG. 5, this determined G-level threshold may be regarded as part of the one or more criteria at which respective application components are to be executed as included in the policy. This would save power resources and at the same time provide users with the most importance services. In addition, the method can be applied to application programs which were not initially programmed to prioritize certain sections of the application code or certain types of traffics or services.

As mentioned with reference to FIG. 2, in some embodiments, the determined policy may be a traffic policy in a PCRF function in 4G (which may be included in the LTE application program in FIG. 3) or a PCF function in 5G (which may be included in the NR application program in FIG. 3). The traffic policy associated with a G3 level may be, for example, placed in the format of: "When the cell-site energy status=WARNING, drop video traffic", which would mean that no spectrum would be allocated for traffic identified as video when a current determined G-level threshold is G3. As another example, the traffic policy associated with a G1 level may be "When the cell-site energy status=CRITICAL, accept only 112 traffic", which would mean that 112 calls are prioritized and any energy resource available would be allocated to servicing only emergency calls when the current determined G-level threshold is G1, thus increasing the capacity allocated for this type of calls while deprioritizing all other traffic and the processing associated with other types of packets. In these examples, the "cell-site energy status" may be regarded as being indicative of a current amount of energy resource available to the application program. This technique is highly advantageous over other techniques which involve slowing down all traffic, including potentially accepting fewer 112 calls (as would be the case if for example the frequency of the processor executing the application code is reduced by transition to a lower P-state). It will be appreciated that although the drawings and the description herein refer to "112 calls", the same principle can be applied to other types of emergency calls which may not use the phone number 112, depending on requirements and/or regulations of the particular jurisdiction.

Figure 8:
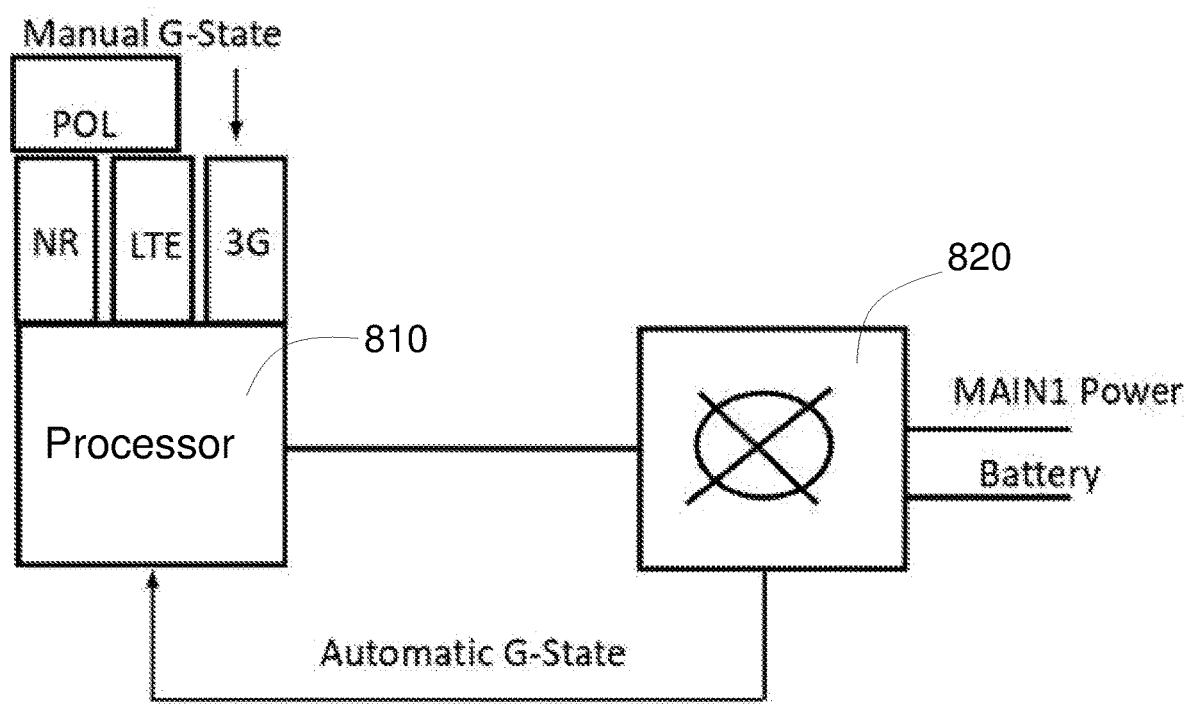
FIG. 8 is a schematic diagram illustrating the overall system architecture of an apparatus according to embodiments of the disclosure.

FIG. 8 is a schematic diagram illustrating the overall system architecture of an apparatus according to embodiments of the disclosure. The apparatus may be a network node in a mobile network, for example.

As shown in FIG. 8, there is provided a processor 810 and a power supply unit 820. In this embodiment, a number of radio access network (RAN) application programs, labelled LTE (which stands for Long-Term Evolution), NR (which stands for New Radio), and 3G in the drawing (such that each of these application programs is identified by the particular 3GPP technology), are to be executed by a processor 810. It is understood that internally each of these application programs comprises a large number of functional components as standardized by 3GPP. The power supply unit 820 is configured to provide statistics with respect to the type of power resource available at any given moment in time. The statistics information may be associated with the mains power supply (labelled "MAIN1 Power" in FIG. 8), the battery power supply (labelled "Battery" in FIG. 8), or both. The power supply unit 820 in this embodiment is also configured to provide information associated with the remaining power budget of the battery power supply, in the case where the battery power supply is used.

The RAN application programs executing on top of the processor platform may either be configured to execute for a specific G-level (this approach being labelled as "Manual G-State" in FIG. 8) according to the respective determined policy (labelled as "POL" in FIG. 8) for running the application program, or be configured to automatically switch between G-levels in a pre-defined manner depending on the information associated with current battery power supply availability (this approach being labelled as "Automatic G-State" FIG. 8). For "Manual G-State", the operation mode for running the respective RAN application program is performed by an operator; for "Automatic G-State", the operation mode is determined based on acquired information associated with a current amount of energy resource available to the application program. In some embodiments, when "Automatic G-State" is implemented there may be support for manual override, i.e. switching from "Automatic G-State" to "Manual G-State" when required.

Thus, embodiments of the present disclosure provide methods and apparatuses for managing power resources of a mobile network application program which can allow different power granularity of application execution for fulfilling different energy requirements and constraints. This translates into reduced costs due to lower battery power requirements since predictable operations can be achieved in areas where running on battery power happens frequently. The overall sustainability of sites can also be increased since sites require fewer batteries to be installed and thus requiring less natural resources.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The above disclosure sets forth specific details, such as particular embodiments or examples for purposes of explanation and not limitation. It will be appreciated by one skilled in the art that other examples may be employed apart from these specific details.

The invention claimed is:

1. A method for managing power resources of a mobile network application program including application code executable by a computer or processor, wherein the application code comprises a plurality of sections, the method comprising:
   assigning a profile to each of the plurality of sections of the application code, wherein each profile comprises information indicative of at least one of: a level of energy demand of the respective section of the application code, a level of functional priority of the respective section of the application code, and a level of accuracy of the functionality associated with the respective section of the application code;
   determining an operation mode for running the application program, wherein the operation mode includes one or more criteria which are to be satisfied by a profile assigned to a section of the application code in order for the respective section to be executed, wherein each profile comprises information indicative of the level of functional priority of the respective section of the application code, and the level of functional priority of each profile is represented by a priority value, wherein at least one or more criteria of the determined operation mode is indicative of a minimum priority value to be satisfied by a profile for said profile to be selected for execution;
   selecting one or more sections of the application code which satisfy the criteria included in the determined operation mode; and
   running the application program by only executing the selected one or more sections of the application code.

2. The method according to claim 1, wherein the mobile network application program is partitioned into the plurality of sections based on at least one of: different functionalities of parts of the application code, and different energy demands of parts of the application code.

3. The method according to claim 1, further comprising acquiring information associated with a current amount of energy resource available to the application program, wherein determining the operation mode for running the application program is based on the acquired information associated with a current amount of energy resource available to the application program.

4. The method according to claim 3, wherein the information associated with a current amount of energy resource available to the application program is acquired from a power supply unit connected to a computer or processor executing the application program, and wherein the power supply unit comprises at least one of a mains power supply and a battery power supply.

5. The method according to claim 3, further comprising:
   acquiring updated information associated with a current amount of energy resource available to the application program;
   determining a new operation mode for running the application program based on the updated information associated with a current amount of energy resource available to the application program;
   selecting one or more new sections of the application code which satisfy the criteria included in the determined new operation mode; and
   running the application program by only executing the selected one or more new sections of the application code.

6. The method according to claim 1, wherein determining the operation mode for running the application program is performed by an operator.

7. The method according to claim 1, wherein the priority value representing the level of functional priority of each profile is selected from one of a plurality of predetermined priority values, and wherein the determined operation mode always includes a criterion indicating that a profile having a first priority value is to be selected for the execution.

8. The method according to claim 1, wherein determining the operation mode for running the application program comprises selecting the operation mode from a plurality of candidate policies.

9. The method according to claim 1, further comprising modifying, by an operator, at least one of the one or more criteria included in a candidate operation mode.

10. The method according to claim 9, wherein modifying at least one of the one or more criteria included in the candidate operation mode is performed while the application program is running.

11. A method for managing power resources of a mobile network application program, wherein the application program comprises a plurality of application components executable by a computer or processor, the method comprising:
   acquiring information associated with energy consumption behavior of each of the plurality of application components;
   determining a policy for running the application program, wherein the policy indicates, for each of the plurality of application components, one or more criteria at which the respective application component is to be executed, and wherein determining the policy is based on the acquired information associated with the energy consumption behavior of each of the application components and a current amount of energy resource available to the application program, and wherein each profile comprises information indicative of a level of functional priority of the respective application components, and the level of functional priority of each profile is represented by a priority value, wherein at least one or more criteria of the determined policy is indicative of a minimum priority value to be satisfied by the respective application components in order to be executed; and running the application program by executing one or more application components only when a profile assigned to the respective component satisfies the criteria indicated in the determined policy for the respective component.

12. The method according to claim 11, wherein for at least one of the plurality of application components, at least one of the one or more criteria indicated by the determined policy dictates that the respective application component is to be executed only for a specific objective.

13. The method according to claim 11, further comprising:

acquiring updated information associated with a current amount of energy resource available to the application program;

determining a new policy for running the application program based on the acquired information associated with the energy consumption behavior of each of the application components and the updated information associated with a current amount of energy resource available to the application program, wherein the new policy indicates, for each of the plurality of application components, one or more criteria at which the respective application component is to be executed; and running the application program by executing one or more application components only when a profile assigned to the respective component satisfies the criteria indicated in the determined new policy for the respective component.

14. The method according to claim 11, wherein determining a policy for running the application program comprises selecting the policy from a plurality of candidate policies.

15. The method according to claim 11, wherein determining a policy for running the application program is performed by an operator.

16. The method according to claim 11, wherein the determined policy is a traffic policy in a Policy and Charging Rules Function, PCRF, in 4G, or a Policy Control Function, PCF, in 5G.

17. An apparatus configured to manage power resources of a mobile network application program including application code, wherein the application code comprises a plurality of sections, the apparatus comprising processing circuitry and memory collectively configured to:

assign a profile to each of the plurality of sections of the application code, wherein each profile comprises information indicative of at least one of: a level of energy demand of the respective section of the application code, a level of functional priority of the respective section of the application code, and a level of accuracy of the functionality associated with the respective section of the application code;

determine an operation mode for running the application program, wherein the operation mode includes one or more criteria which are to be satisfied by a profile assigned to a section of the application code in order for the respective section to be executed, wherein each profile comprises information indicative of the level of functional priority of the respective section of the application code, and the level of functional priority of each profile is represented by a priority value, wherein at least one or more criteria of the determined operation mode is indicative of a minimum priority value to be satisfied by a profile for said profile to be selected for execution;

select one or more sections of the application code which satisfy the criteria included in the determined operation mode; and run the application program by only executing the selected one or more sections of the application code.

18. The apparatus according to claim 17, wherein the apparatus is a network node in the mobile network.

19. An apparatus configured to manage power resources of a mobile network application program, wherein the application program comprises a plurality of application components, the apparatus comprising processing circuitry and memory collectively configured to:

acquire information associated with energy consumption behavior of each of the plurality of application components;

determine a policy for running the application program, wherein the policy indicates, for each of the plurality of application components, one or more criteria at which the respective application component is to be executed, and wherein determining the policy is based on the acquired information associated with the energy consumption behavior of each of the application components and a current amount of energy resource available to the application program, and wherein each profile comprises information indicative of a level of functional priority of the respective application components, and the level of functional priority of each profile is represented by a priority value, wherein at least one or more criteria of the determined policy is indicative of a minimum priority value to be satisfied by the respective application components in order to be executed; and run the application program by executing one or more application components only when a profile assigned to the respective component satisfies the criteria indicated in the determined policy for the respective component.

* * * * *